(12) United States Patent
Chiang

(10) Patent No.: US 6,401,950 B1
(45) Date of Patent: Jun. 11, 2002

(54) COLLAPSIBLE METAL WIRE BASKET

(76) Inventor: Chuang-Chih Chiang, No. 13, Chingyang Rd., Yuanpao Tsun, Taya Hsiang, Taichung County (TW)

( * ) Notice: Subject to any disclaimer, the term of this patent is extended or adjusted under 35 U.S.C. 154(b) by 0 days.

(21) Appl. No.: 09/948,626

(22) Filed: Sep. 10, 2001

(51) Int. Cl.[7] .................................................. B65D 6/18
(52) U.S. Cl. ............................... 220/1.5; 220/6; 220/7; 220/485
(58) Field of Search .................. 220/105, 6, 7, 220/4.28, 485, 489

(56) References Cited

U.S. PATENT DOCUMENTS

| | | | | |
|---|---|---|---|---|
| 2,681,744 A | * | 6/1954 | Averill | 206/599 |
| 2,738,940 A | * | 3/1956 | Coit, Jr. | 108/53.5 |
| 2,916,178 A | * | 12/1959 | Arthur | 108/53.5 |
| 3,627,163 A | * | 12/1971 | Taylor et al. | 206/512 |
| 4,240,555 A | * | 12/1980 | Jurasek | 108/53.1 |
| 4,324,172 A | * | 4/1982 | Cazals et al. | 220/4.28 |
| 4,662,532 A | * | 5/1987 | Anderson et al. | 220/1.5 |
| 4,880,118 A | * | 11/1989 | Petter | 206/511 |
| 5,101,995 A | * | 4/1992 | Trubiano | 220/1.5 |

* cited by examiner

Primary Examiner—Stephen Castellano
(74) Attorney, Agent, or Firm—Rosenberg, Klein & Lee

(57) ABSTRACT

A collapsible metal wire basket includes a rectangular bottom panel, two first side panels hinged to first two opposite sides of the bottom panel, the first side panels each having two C-shaped coupling blocks bilaterally disposed at the top, each C-shaped coupling block having a coupling hole and a top positioning notch, and two second side panels respectively hooked on the other two opposite sides of the bottom panel and respectively detachably forced into engagement with the coupling hole and top positioning notch of each of the C-shaped coupling blocks.

1 Claim, 4 Drawing Sheets

COLLAPSIBLE METAL WIRE BASKET

BACKGROUND OF THE INVENTION

The present invention relates to baskets and, more particularly, to a metal wire basket, which is collapsible and strong enough to support a heavy load.

Conventional metal wire baskets are commonly made by directly welding metal wire panels to one another. These metal wire baskets are not collapsible. FIG. 1 shows another structure of metal wire basket 10 according to the prior art. The metal wire basket 10 comprises a metal wire bottom panel 11, and four metal wire side panels, namely, the two first metal wire side panels 12 and the two second metal wire side panels 13 respectively coupled to the four sides of the metal wire bottom panel 11 and fastened to one another by C-shaped clamps 14. The two first metal wire side panels 12 each have two outwardly extended end pieces 120 for positioning. This structure of metal wire basket 10 has numerous drawbacks as outlined hereinafter:
1. The basket occupies much storage space when not in use because it is not collapsible.
2. In order to detach the basket, a tool must be used to open/damage the C-shaped clamps, however the C-shaped clamps become useless when opened/damaged.
3. The basket is less strong because the metal wire panels of the basket tend to be forced away from the C-shaped clamps when holding heavy products.
4. The basket cannot support a heavy load because the outwardly extended positioning end pieces of the first metal wire side panels tend to be deformed.

SUMMARY OF THE INVENTION

The present invention has been accomplished to provide a metal wire basket, which eliminates the aforesaid drawbacks. It is one object of the present invention to provide a metal wire basket, which is collapsible. It is another object of the present invention to provide a collapsible metal wire basket, which has a high structural strength to support a heavy load. According to the present invention, the two first side panels of the basket are respectively pivoted to the bottom panel, and the two second side panels of the basket are respectively hooked on the bottom panel and detachably coupled to C-shaped coupling blocks at two sides of each of the first side panels.

DETAILED DESCRIPTION OF THE PREFERRED EMBODIMENT

Figure 1:
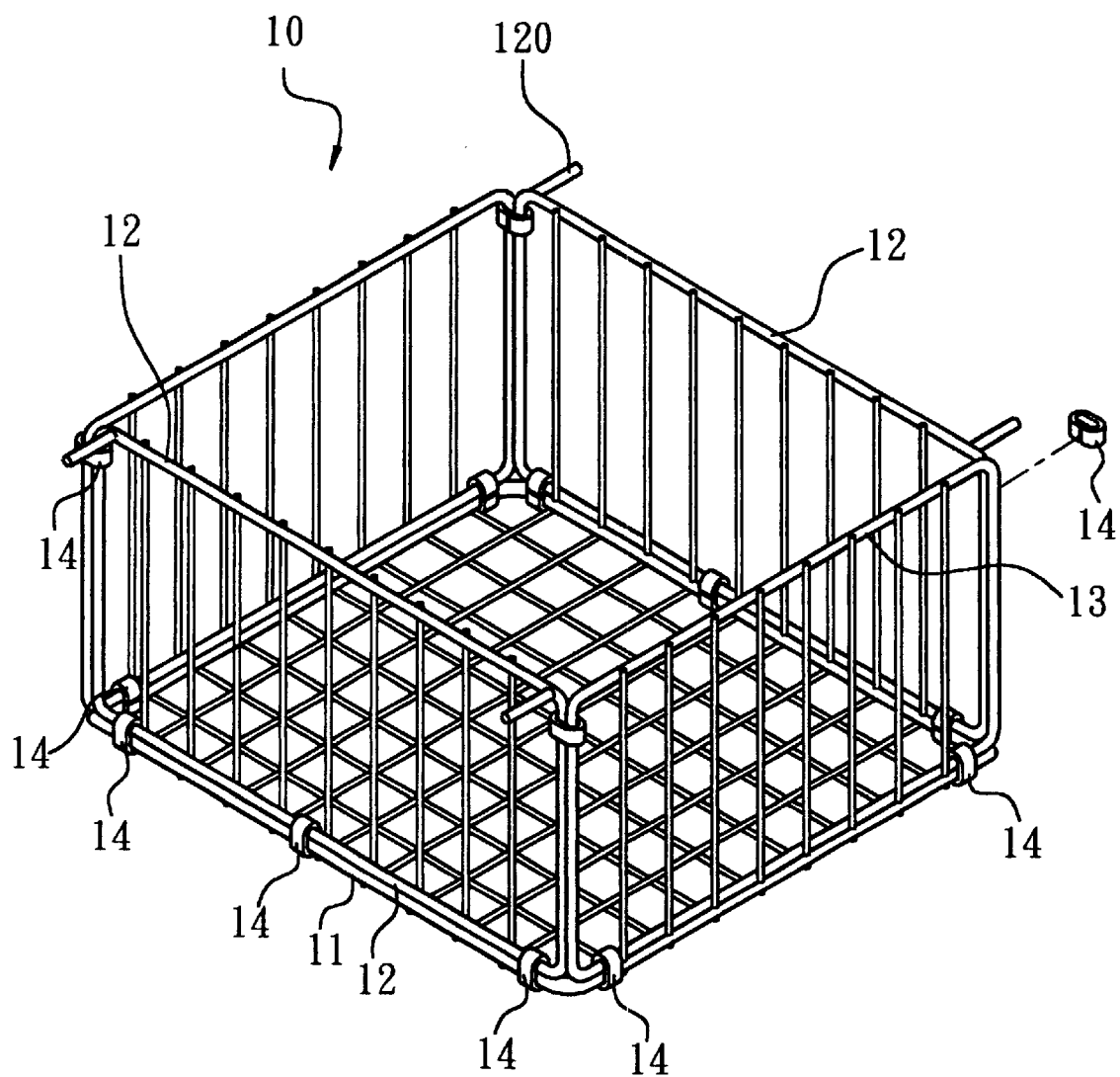
FIG. 1 is an elevational view of a metal wire basket according to the prior art.

Referring to FIGS. 2A, 2B, 3A, and 3B, a collapsible metal wire basket 20 is shown comprised of a bottom panel 21, and four side panels, namely, the first side panels 22 and the second side panels 23. Four connectors 24 are respectively bilaterally coupled between two first opposite sides of the bottom panel 21 and the bottom side of each of the first side panels 22 to secure the first side panels 22 and the bottom panel 21 together, enabling the first side panels 22 to be turned between the collapsed horizontal position (see FIG. 2B) and the vertical operative position (see FIG. 2A). The connectors 24 are respectively welded H to the bottom panel 21, and then the first side panels 22 are respectively coupled to the connectors 24. The second side panels 23 each have two hook plates 25 bilaterally disposed at the bottom side and respectively hooked on the second opposite sides of the bottom panel 21. The first side panels 22 each have two fixed coupling blocks 30 bilaterally disposed near the top side and adapted to secure the second side panels 23. The coupling blocks 30 are C-shaped metal members welded H to the first side panels 22, each having a coupling hole 31 and a top positioning notch 32. During assembly, the hook plates 25 of the second side panels 23 are respectively hooked on the bottom panel 21, and then the vertical side wire rods and horizontal top wire rods of the second side panels 23 are respectively forced into the coupling hole 31 and top positioning notch 32 of each of the coupling blocks 30, keeping the second side panels 23 secured to the first side panels 22 in vertical. Further, the two first side panels 22 each have a substantially C-shaped wire rod 220 outwardly disposed at the top for positioning.

Figure 2A:
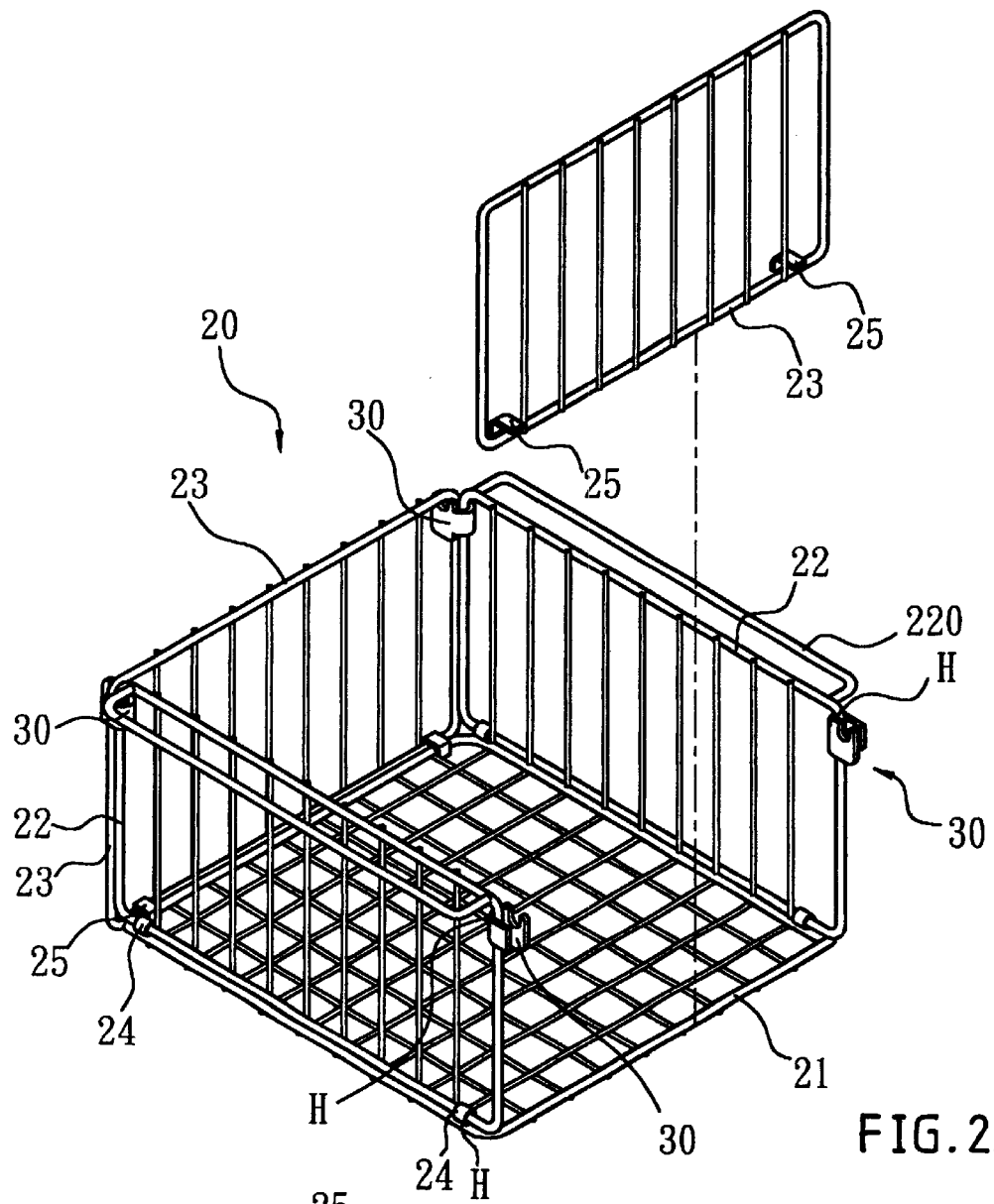
FIG. 2A is an exploded view of a collapsible metal wire basket according to the present invention.
Figure 2B:
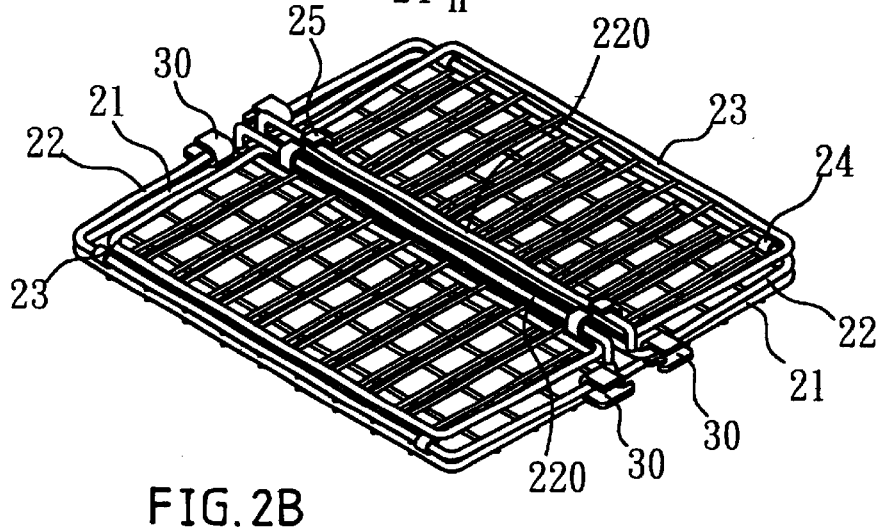
FIG. 2B shows the collapsible metal wire basket collapsed according to the present invention.
Figure 3A:
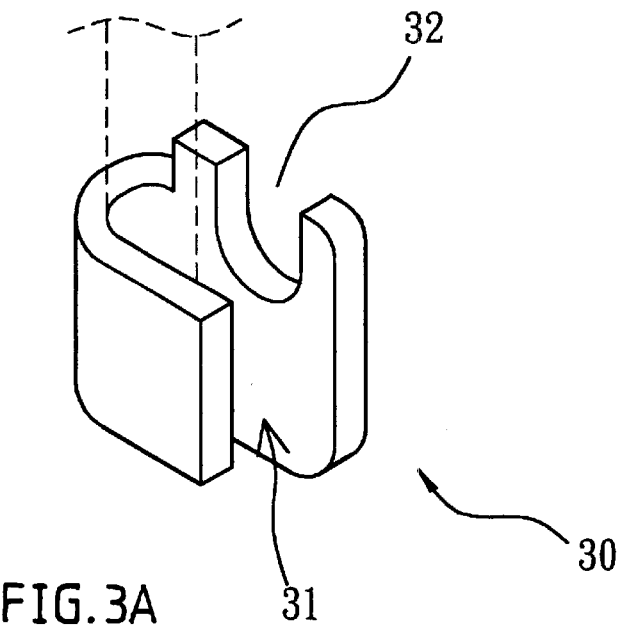
FIG. 3A is an elevational view of a coupling block for the collapsible metal wire basket according to the present invention.
Figure 3B:
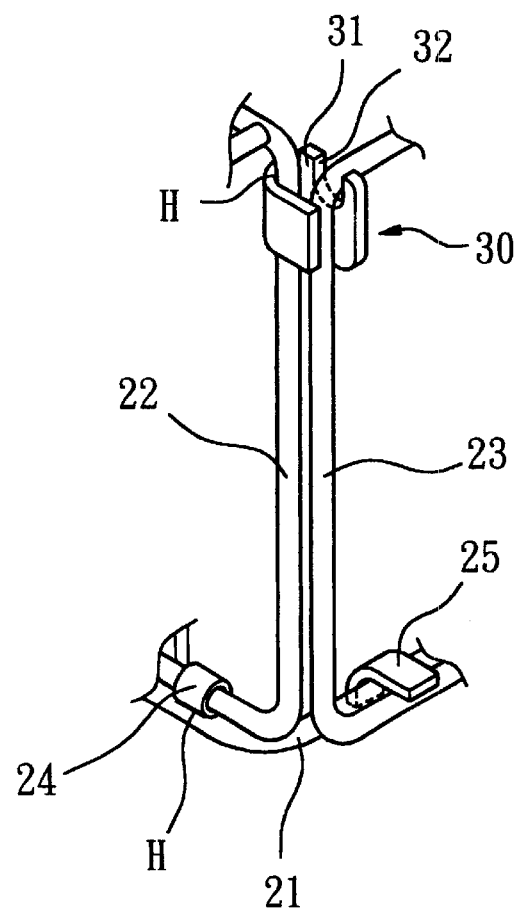
FIG. 3B is an enlarged view of a part of the present invention, showing the connection between one first side panel and one second side panel.

When not in use, the second side panels 23 are disengaged from the coupling blocks 30 and then disconnected from the bottom panel 21, and then the first side panels 22 are collapsed and closely attached to the bottom panel 21, and then the detached second side panels 23 are put on the collapsed first side panels 22 (see FIG. 2B).

Because the first side panels 22 are hinged to the bottom panel 21 by the connectors 24 and the second side panels 23 are hooked on the bottom panel 21 by the hook plates 25 thereof and secured to the coupling blocks 30 of the first side panels 22, the metal wire basket 20 is strong enough to support a heavy load and, the panels 21, 22 and 23 do not disconnect from one another easily.

Figure 4:
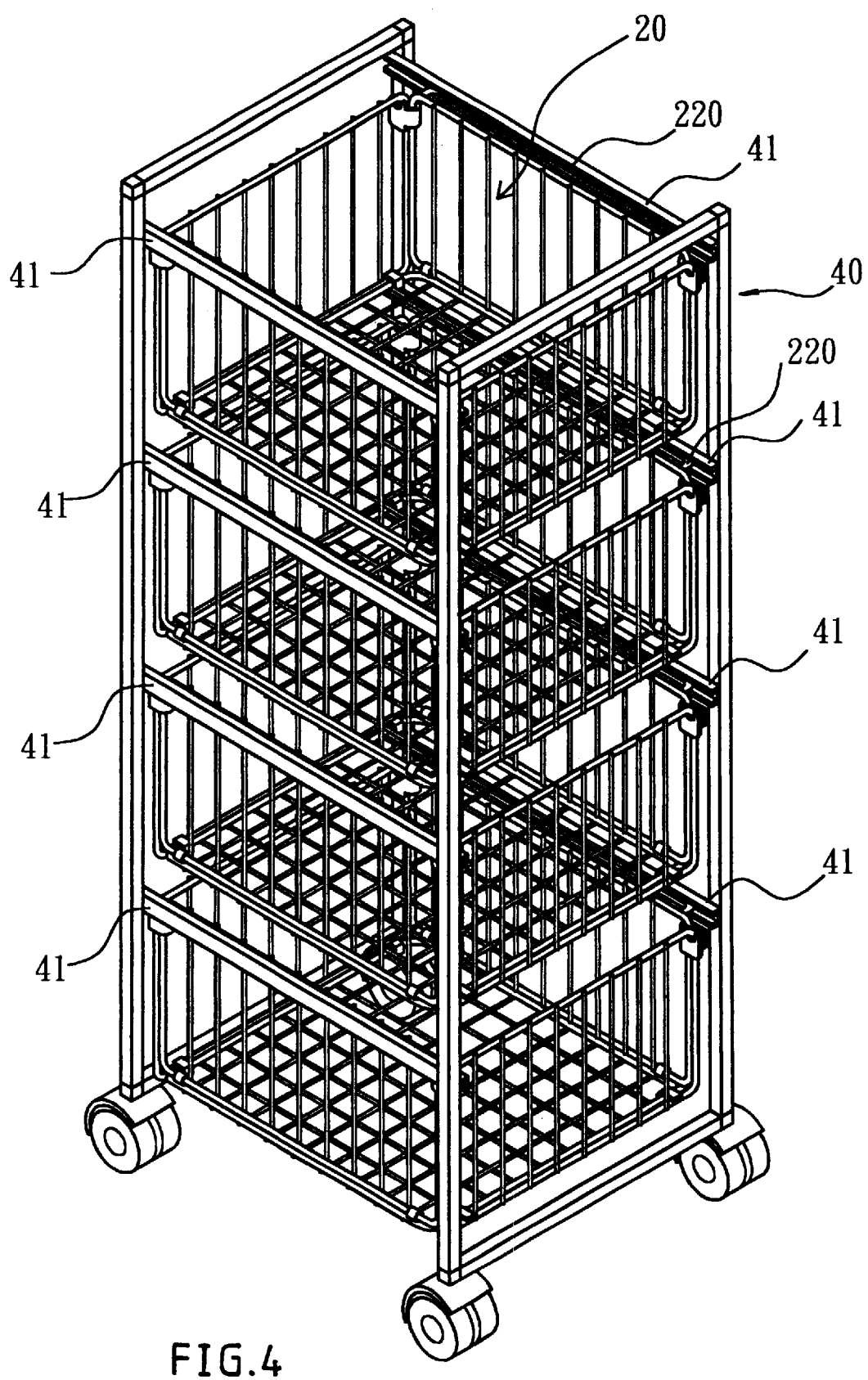
FIG. 4 shows an application example of the present invention.

FIG. 4 shows an application example of the present invention, in which the substantially C-shaped wire rods 220 of the metal wire baskets 20 are respectively positioned on the transverse side bars 41 of a wheeled rack 40 at different elevations.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:
1. A collapsible metal wire basket comprising a bottom panel having first two opposite sides and second two opposite sides, four connectors respectively welded to the first two opposite sides of said bottom panel, two first side panels respectively pivoted to said connectors, and two second side panels respectively coupled to the second two opposite sides of said bottom panel and secured between said first side panels, said second side panels each having two bottom hook plates respectively hooked on the second two opposite sides of said bottom panel, wherein said first side panels each have two fixed C-shaped coupling blocks bilaterally disposed near a top side thereof and adapted to secure said second side panels, said C-shaped coupling blocks each having a coupling hole adapted to receive one vertical side wire rod of one of said second side panels, and a top positioning notch adapted to receive one horizontal top wire rod of one of said second side panels.

* * * * *